United States Patent [19]

Grün et al.

[11] Patent Number: 4,543,029

[45] Date of Patent: Sep. 24, 1985

[54] DEVICE FOR CUTTING FLEXIBLE CONTAINERS CONTAINING FUNGIBLE MATERIAL

[75] Inventors: Gustav Grün, Ortenberg; Klaus Borgner, Hirzenhain, both of Fed. Rep. of Germany

[73] Assignee: Luco-Technic GmbH Verfahrenstechnische Anlagen, Lissberg, Fed. Rep. of Germany

[21] Appl. No.: 529,943

[22] Filed: Sep. 7, 1983

[30] Foreign Application Priority Data

Sep. 27, 1982 [DE] Fed. Rep. of Germany ....... 3235711
Jun. 1, 1983 [DE] Fed. Rep. of Germany ....... 3319852

[51] Int. Cl.$^4$ .............................................. B65G 65/34
[52] U.S. Cl. ..................................... 414/412; 209/288
[58] Field of Search ........................ 414/412; 241/235; 209/288

[56] References Cited

U.S. PATENT DOCUMENTS 4,182,592 1/1980 Henryson ............................ 414/412
4,279,558 7/1981 Lavoi ................................. 414/412

*Primary Examiner*—Robert G. Sheridan
*Attorney, Agent, or Firm*—Ernest F. Marmorek

[57] ABSTRACT

Apparatus for cutting of bags containing tricklable materials, as well as for separating the goods from bag parts, with a sieve drum and separate outlets for the bag parts, oversized particles, and the goods to be discharged, comprising a bag guidance with a floor inclined in dependence of the load, in a quasi-uniform, upper-and-lower engagement of the cutters to the bag, the cutters being coaxially and peripherally aligned with respect to one another, as well as for a uniform fragmentation and distribution of the goods to be discharged over the length of the sieve drum through accumulation rings.

21 Claims, 13 Drawing Figures

DEVICE FOR CUTTING FLEXIBLE CONTAINERS CONTAINING FUNGIBLE MATERIAL

BACKGROUND OF THE INVENTION

The invention relates to a device for cutting of bags of paper, synthetic material, jutes or the like containing powdery up to granular and/or granulated or flocculent materials, as well as for loosening or separation of the goods from the bag or its parts, consisting of a receiving housing supplied by the conveyer, and including a cutting mechanism, a sieve drum disposed in the housing having respective separate outlets for the bag parts, for the goods to be discharged, as well as for any oversized particles to be separated.

From DE-AS No. 1,209,951 there has become known a bag-tearing apart discharge mechanism, in which the filled bag is fragmented and supplied to a sieve arrangement through a chute, by means of which the separation and sifting of the bag contents from the bag material is accomplished.

In this mechanism there are disposed in a so-called "cutter roller housing" two cutting rollers located next to one another, and in parallel, driven at respective opposite directions, and provided on the periphery with radially disposed cutters in such a manner that the cutters cam with one another.

As mesh mechanism there is provided a sieve drum which is disposed substantially horizontally in the direction of the outlet, and which is conically diverging, so as to attain good conveyance conditions within the drum, without there being provided any particular formation of the drum units, such good conveyance conditions being otherwise available only in the case of an inclined drum.

The cut bags are supplied through a widened region into a delivery chute, while the sieve is received below the screw conveyor by a collecting worm gear, and is withdrawn from the collecting worm gear, for example by means of a pneumatic supply arrangement.

It is a disadvantage of this arrangement, that the introduction of the bags between the oppositely driven cutter rollers is accomplished practically without any precoupled separate alignment arrangement, so that the bag is introduced between the cutter rollers without necessarily always being optimally aligned. The cutter rollers, which provide for a plurality of cutters arranged in star configurations separated by gaps therebetween, fragment the bags into pieces of uncontrollable size which have predominantly cut edges.

In this connection, it is to be pointed out that it is just the cut rim regions of bag parts, which, due to accumulation and adhesion of powdery goods impair conveyance, so that the separation of the remaining goods from the bag material is made much more difficult.

Further disadvantages of this arrangement are, amongst others, the increased tendency for a rapid passage of a substantial portion of the powdery-to-granulate material up to the end region of the drum due to the conical widening, so that a receiving device disposed therebelow, in this case a screw conveyor, is loaded in its end region considerably more than in its inlet region.

This can lead to accumulations, and also to overflow or the material in the direction of bag wastages.

A particular problem exists for all cutting mechanisms, which are required to have cutters cutting into the bag at approximately the same depth from above and from below, if the bag is damaged, during the transport to the device, through any external influences, so that the volume, particularly the thickness of the bag, is reduced, and so that a so-called "limp bag" is obtained.

In such a case it is possible that only the receiving surface of the bag on the inlet floor is cut, while the bag portion disposed thereabove is passed practically without any separation approximately at the size of the support surface of the bag, into the sieve drum, which can cause accumulations and disturbances there.

SUMMARY OF THE INVENTION

Starting from this state-of-the art, it is an object of the invention to devise an arrangement of the initially described type, which prevents tearing of the bags into pieces of non-defined size, and which separates these cut pieces, the size of which is substantially determined by the cutters and by the guidance of the bag, even if the bag is incompletely filled, and wherein the device is to make possible a practically complete separation of the goods to be discharged from the bag parts, and furthermore is to enable a uniform discharge of the separated goods mainly already along the first third of the sieve drum.

Summarizing then, the object of the invention can be seen therein, that a better separation of the bag parts from the goods, and a uniform discharge of the goods without any risk of accumulation is to be obtained.

The inventive solution of this object provides by the floor the directional chute, which is provided in the receiving housing with through-going openings for the cutters, being disposed pivotally about an axle, which is secured at the inlet, and wherein the position of the axle, which is inclined in the direction of the inlet region of the cutters in dependence of the load, is determined by at least one resilient element supported directly or indirectly on the receiving housing, so that the inclination of the floor for a practically equal penetration depth of the cutters disposed thereabove and therebelow into the bag is set independently of the weight, or of the thickness of the bag dependent thereon, and wherein the cutters are arranged in pairs and are disposed in the receiving housing so that the cutters of each pair face one another, a first cutter of the pair being coaxially aligned with the first cutters of all remaining pairs, the second cutter of the the pair being coaxially aligned with the second cutters of the remaining pairs, and by the sieve drum being provided in the discharge direction, at least over a part region of its length, starting from the supply side, with one or several accumulation rings.

By the provision of a special directional chute provided with a floor, which has through-going openings for cutters, which pivots in dependence of the load, there is obtained both a uniform feed to the tools, namely to cutters, and a practically uniform penetration depth of the cutters into the bags from above to below, as well as a fragmentation of the goods, independent of the thickness of the bag.

The proposed arrangement of the cutters, aligned to one another, coaxially pairwise and peripherally in the afore-described manner, ensures, in connection with the directional chute, the separation of the bag into strips having substantially a uniformly remaining size, and wherein renunciation of the known "gap-to-gap" arrangement of the cutters considerably reduces the forces acting perpendicularly to the direction of the bag, which leads to smooth borders of the cut, instead of leading to any disturbance-causing edges.

The accumulation rings provided permit the setting of a practically continuous good discharge over the first third of the length of the sieve drum.

For the formation and selection of the resilient element, it is provided that its spring characteristic be settable, and that the resilient element is implemented as a gas spring and/or as an oil pressure spring, or the like.

For securing of the cutters, it is to be pointed out, that the shafts carrying the cutters are flyingly supported in respective opposite paired and dedicatedly arranged associated guidances within the housing, and wherein a cutter is replaceably attached to each exiting end of a shaft by the cutter holders, that the support of each cutter shaft in the exit region is accomplished by double roller bearings by means of a guidance forming a carrier sleeve, that the end region of the shafts is surrounded by a conical clamping sleeve, each clamping sleeve leading into a respective thread in the region of its smaller diameter, and that two mutually engaging stress plates are associated with this clamping sleeve, which have corresponding passages therefor, are slidable thereonto, and are fixably securable by a stress nut, inclusive of the interposed cutters, to the stress sleeve.

This embodiment permits a simple replacement of the individual cutters, which are preferably so formed, that they are sharpened on one side in a conical fashion, and wherein the respective flat side of each cutter faces the flat side of an oppositely disposed cutter, and wherein the periphery of the cutters may be formed with wave-shaped grinding edges.

The number of the grinding edges and their shape are also determined in the final resort by the goods disposed in the bag.

Basically the wavy cut edges have the advantage, however, that the cutter disks, which have the same diameter in a coaxial direction, can be replaced, or the cutter disks, which are disposed parallel to the axis between the ends of the shafts, and which are lifted cross-wise, can also be replaced.

Each cutter shaft is driven, as a rule, by a separate motor.

As far as the arrangement of the already mentioned accumulation rings is concerned, it is to be noted that the region of the drum equipped therewith extends at least over sixty percent of the length of the drum, or over the entire length of the drum, and that the inner diameter of one or several accumulation rings may be equipped with a detachable, overlapping ring of elastic material.

In the case of the rings consisting of elastic material, one deals primarily with rubber rings, but wherein, in individual cases, depending on the goods to be discharged, also other elastomers can be selected.

The elastic rings contribute to the protection of the goods, or alternatively to the protection of the accumulation rings, depending on the physical properties of the goods to be discharged from the sieve drum.

So as to increase the intensity of the movement within the sieve drum, there are provided in the sieve drum a plurality of entrainment hooks distributed along its inner periphery, disposed, as a rule, in a row, and inclined in the direction of the discharge, and wherein the entrainment hooks are preferably bent in their center region by about ten degrees, and wherein their apices are aligned quasi-concentrically at a spacing from the floor of the drum.

The proposed arrangement and formation of the entrainment hooks ensures a repeatedly occurring and reliable holding and lifting of the bag strips, and a reversal thereof during their passage through the sieve drum, and consequently ensures their optimal discharge prior to their being passed into the discharge chute provided for them.

So as to provide a transfer region between the receiving housing and the sieve drum, it is proposed, that the receiving housing be formed in its discharge reason as an inlet guidance communicating with the sieve drum, and wherein the sieve drum is liftably closable on its end region by a skirt.

By this means a separation between the receiving housing and the sieve drum is possible, and back turbulences from the sieve drum into the receiving house are prevented.

So as to reduce to negligible proportions any possible waste accumulation of goods, such as might particularly arise in microscopic or pressed materials in a severe and disturbing measure, it is proposed in a further development to subject the contents of the bag to a fulling process.

In this connection it is proposed to provide a fulling roller pair disposed upstream of the directional chute for guidance of the bag, which distributes the contents of the goods, and whose rollers are separately drivable, and wherein at least the peripheral velocity of one roller is changeably adjustable, by the axial spacing of the rollers towards one another being variably settable by at least an arrangement of one roller, being displaceable in parallel, and by the positioning members for the position-changeable fixation making an additional load-dependent buffer path available during an overload.

By the pressure adjustably exerted by the rollers onto the goods through the bag due to a presettable distance, the cohesion of the particles, as a rule limited to the outer layer of the goods, is disrupted and the goods are returned to their powder-or particulate form, at least in relatively small individual aggregations, namely lumps.

A considerably improved comminution of agglomerated goods is obtained during the setting of different respective peripheral velocities of the rollers and the "pulverization" of the goods connected therewith, and wherein, of course, the possibility of a premature tearing of the bag during the setting of difference velocities sets limits.

The positioning members enabling the setting of the spacing between the rollers prevent the destruction of the rollers and their drive, due to a buffer path becoming available during an overload.

A separate drive of the rollers by a motor associated with each roller is provided.

It is, of course, also possible that the separate drive of the rollers through a motor, or through gears is accomplished by corresponding take-off means, and by a gear member varying the number of revolutions being associated with at least one drive.

For forming the carrier frame for the rollers, it is proposed, that a slidable sled be provided as a carrier for the roller, which is shiftable parallel to its axis, the sled being movably disposed between two arms of a U-shaped carrier frame through positioning members acted on by pressure, and by the second roller being disposed unchanged in position and in the region of the connecting bar of the two parallel planes of the respective arms or legs of the carrier frame.

A further development enables a threshold-like loading of the contents of the bag.

Here it is provided that there are distributed entrainment elements around the mantle of each roller, at uniform distances, which are disposed parallel to the axis, and which also form squeezing rods, and wherein the entrainment elements are round rods, with which optionally there are associated impact rods displaced by 180°, and which are inclined in the direction of rotation.

A variation of the device dispenses with the conventional sifting sieve for oversized particles generally used in such arrangements.

This variation provides a concentric disposition around the sieve drum of a cylindrical sieve having a small mesh size, and spaced at a distance from the innerlying sieve drum, and wherein the sieve, at least at the discharge side, passes into a closed longitudinal region serving as the discharge zone, and including a discharge parallel to the axle for oversized particles.

For development of the sieve it is proposed that the outer sieve consist of several assembled, but individually replaceable sieve panels, which are carried by a support construction, each sieve panel having a cross-section in the form of a circular segment.

BRIEF DESCRIPTION OF THE DRAWING

The invention is further explained in the enclosed representation by way of a drawing of an example-wise embodiment, and wherein.

DESCRIPTION OF THE PREFERRED EMBODIMENTS

Figure 1:
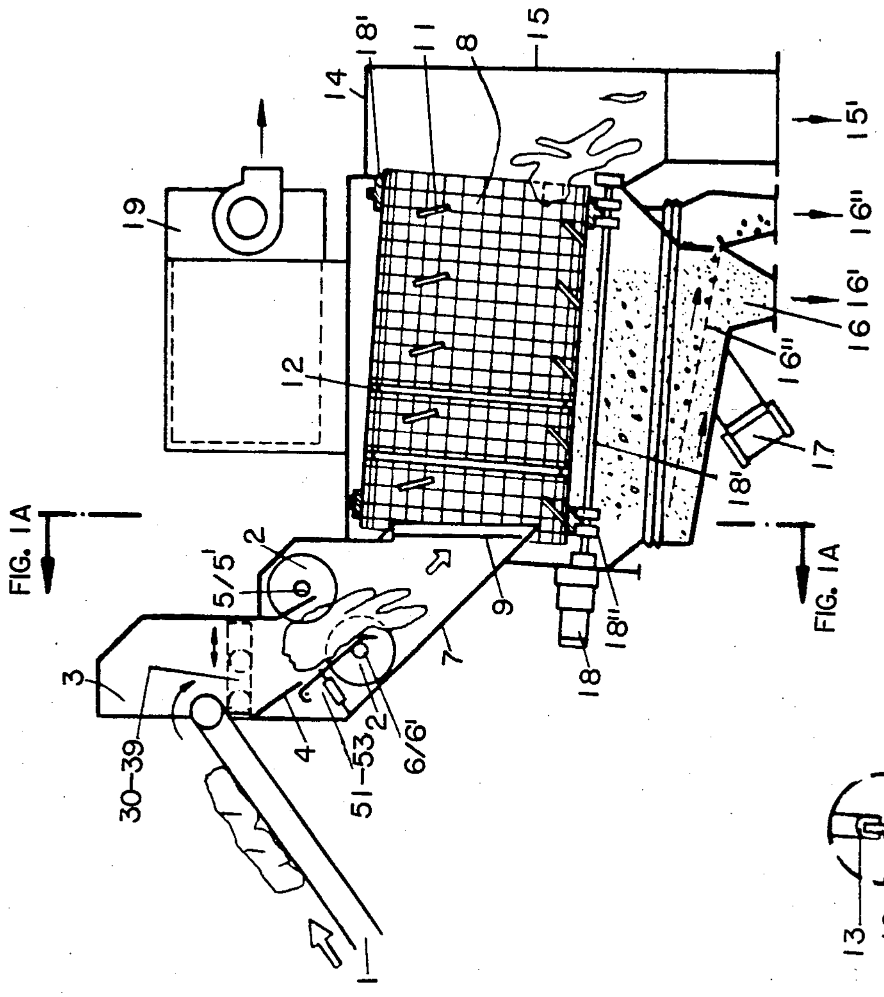
FIG. 1 shows a longitudinal section through a device denoted as a "bag emptying machine", and wherein the formation of the accumulating rings as an enlarged part is deleted.
Figure 1A:
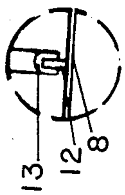
FIG. 1A is a section along line 1A—1A of FIG. 1.
Figure 2:
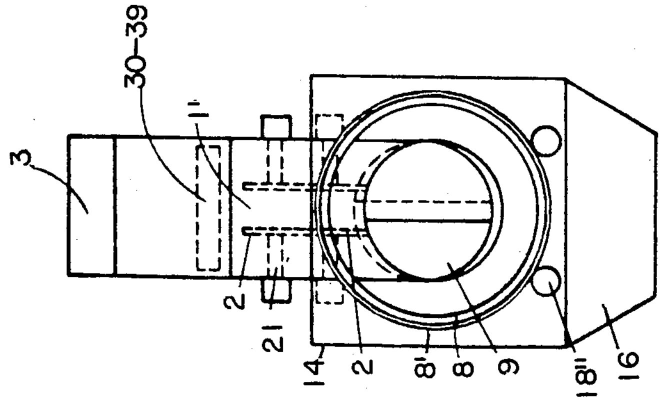
FIG. 2 shows a cross-section along I—I of FIG. 1 through the inlet region of the sieve drum.
Figure 4:
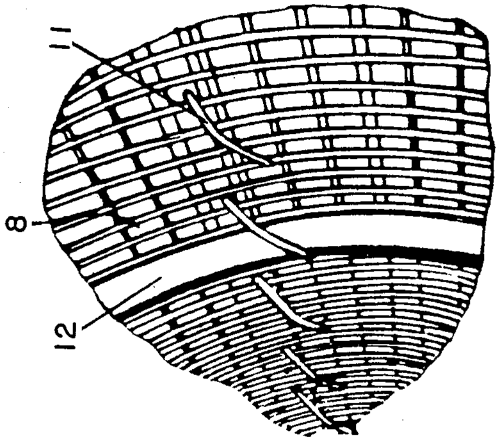
FIG. 4 is a framentary elevation view of the formation and arrangement of the entrainment hooks in the sieve drum.
Figure 3:
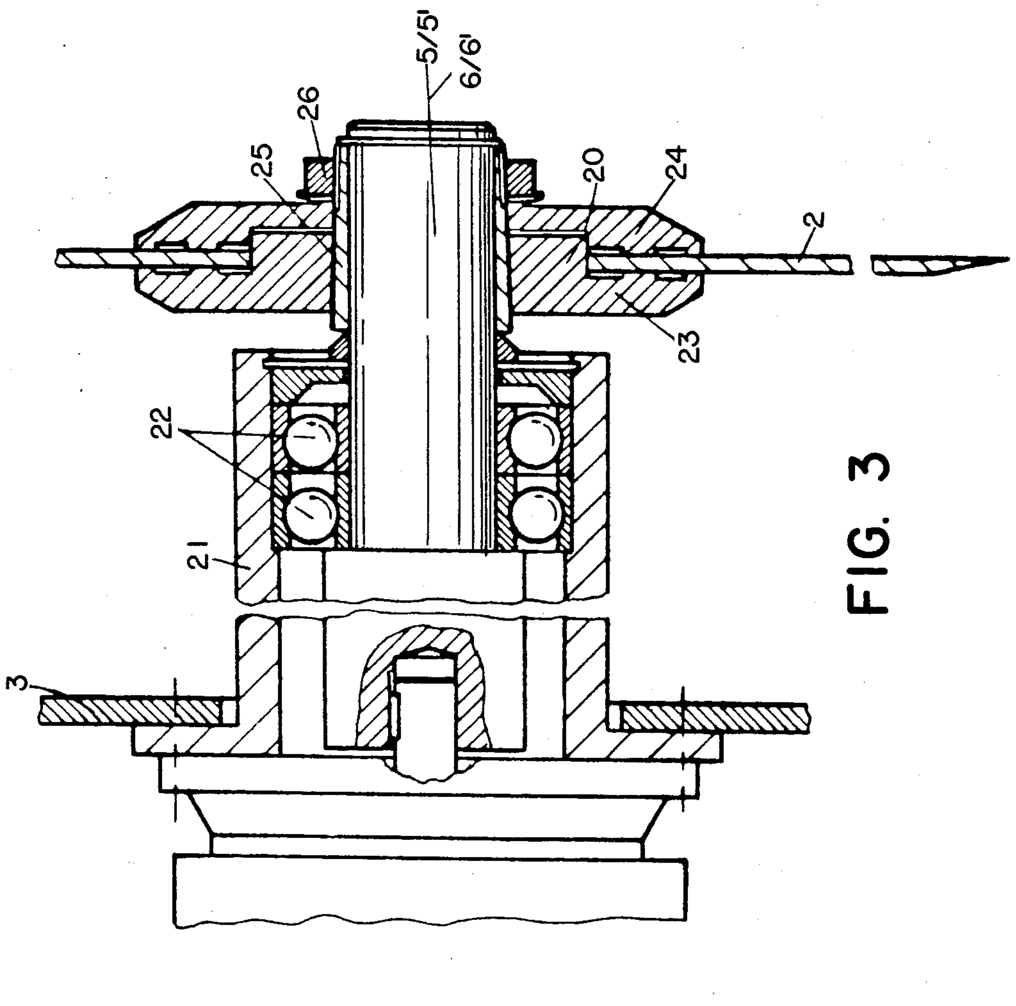
FIG. 3 is a cross-section of the cutters disposed within the directional chute, the cutters engaging the chute.
Figure 5:
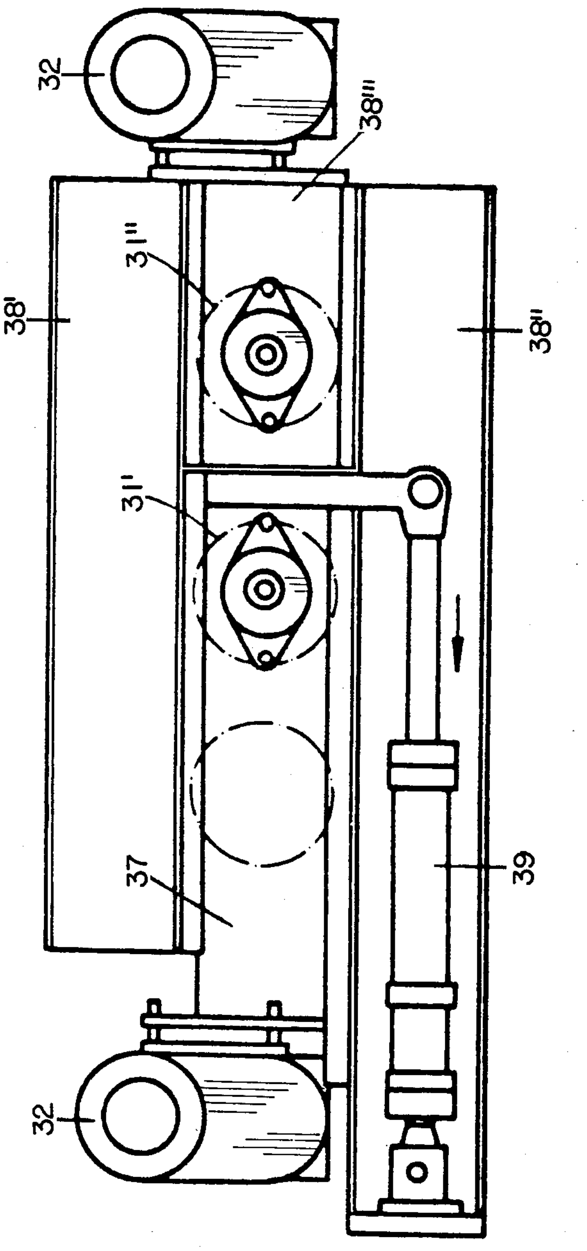
FIG. 5 is an elevation view of a bag fulling mechanism which may be arranged upstream of the feed-in region of the cutters.
Figure 6:
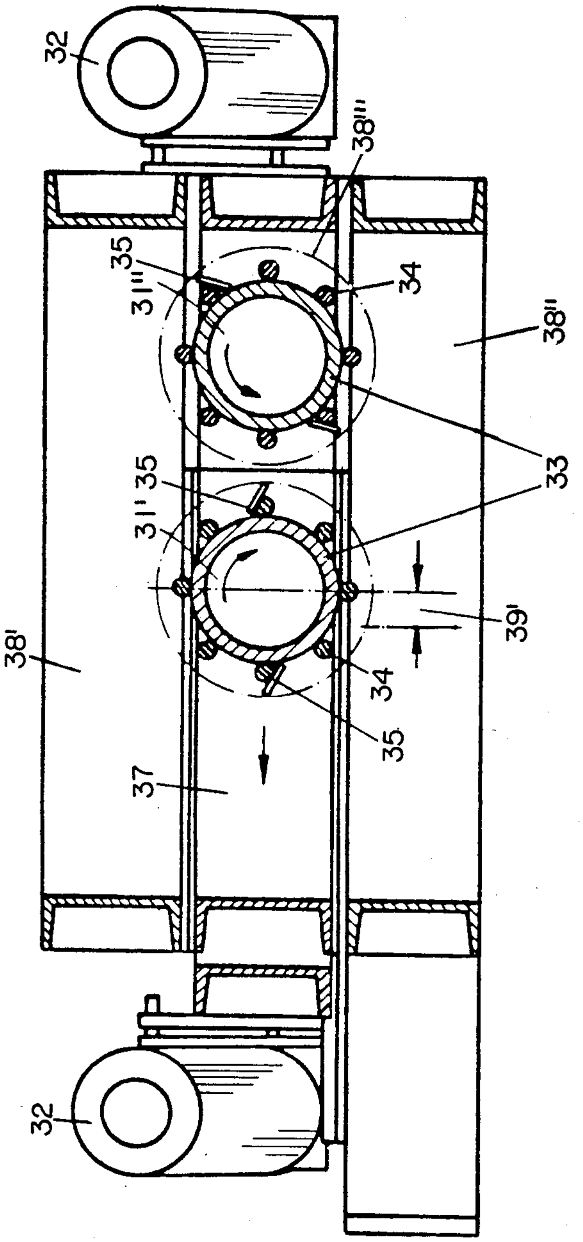
FIG. 6 is a cross section along line I—I of FIG. 7.
Figure 7:
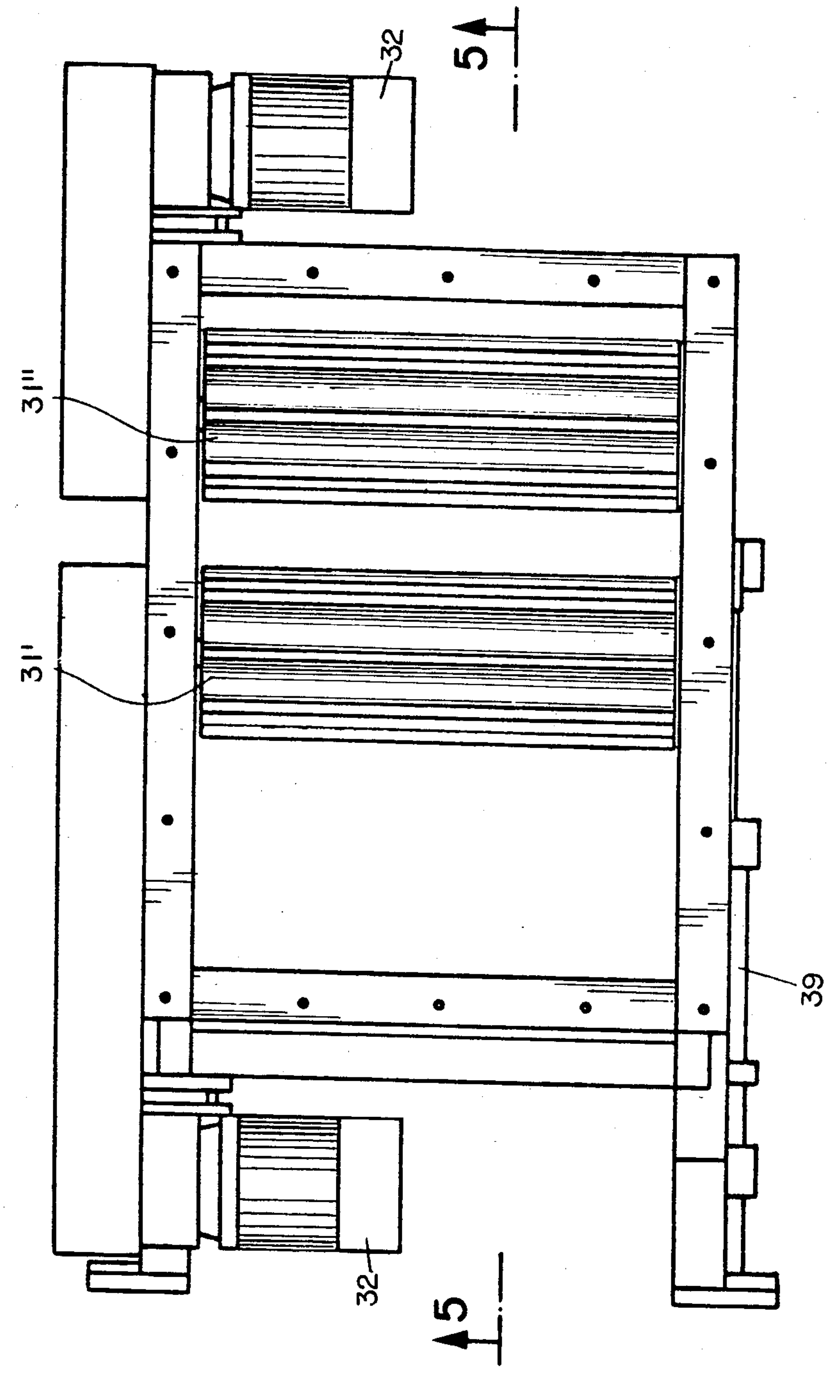
FIG. 7 is a plan view of FIG. 5.
Figure 8:
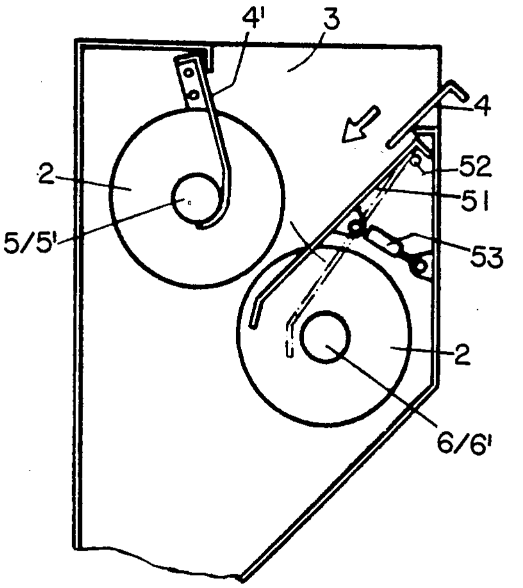
FIG. 8 is a partial view of the directional chute in the receiving housing provided with a pivotable and resiliently supported floor.
Figure 9:
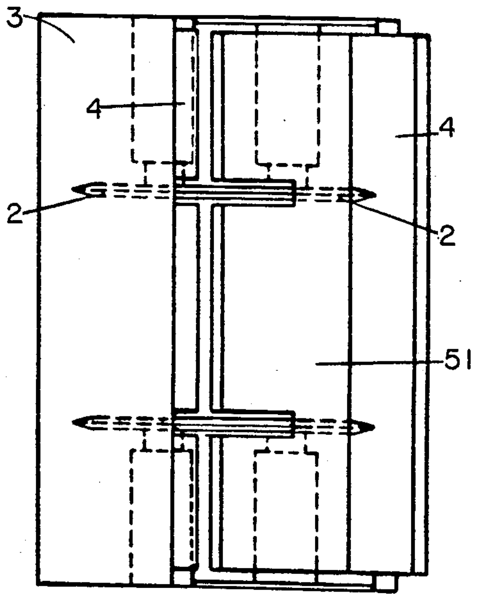
FIG. 9 is a plan view of the chute shown in FIG. 8, from which the position of the cutters, and their passage through the pivotable floor can be ascertained.
Figure 10:
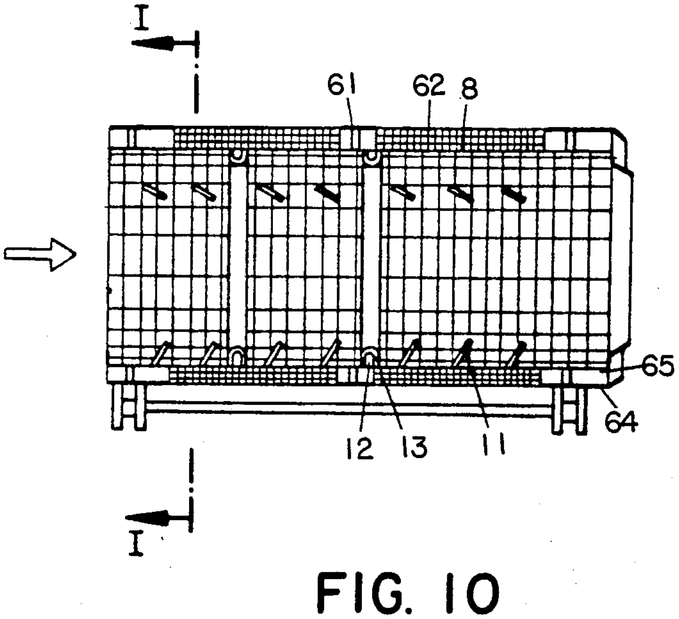
FIG. 10 is a different embodiment of a sieve drum in longitudinal section, deviating from FIG. 1, in which in lieu of an inclined oversized particle sieve, a second outer sieve drum for oversized particles, and having a smaller mesh width, is disposed concentrically with, and at a spacing from the inner drum.
Figure 11:
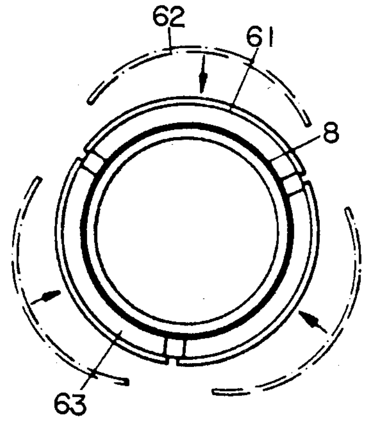
FIG. 11 is a cross section along line I—I of FIG. 10 in dotted representation of individually replaceable sieve panels.
Figure 12:
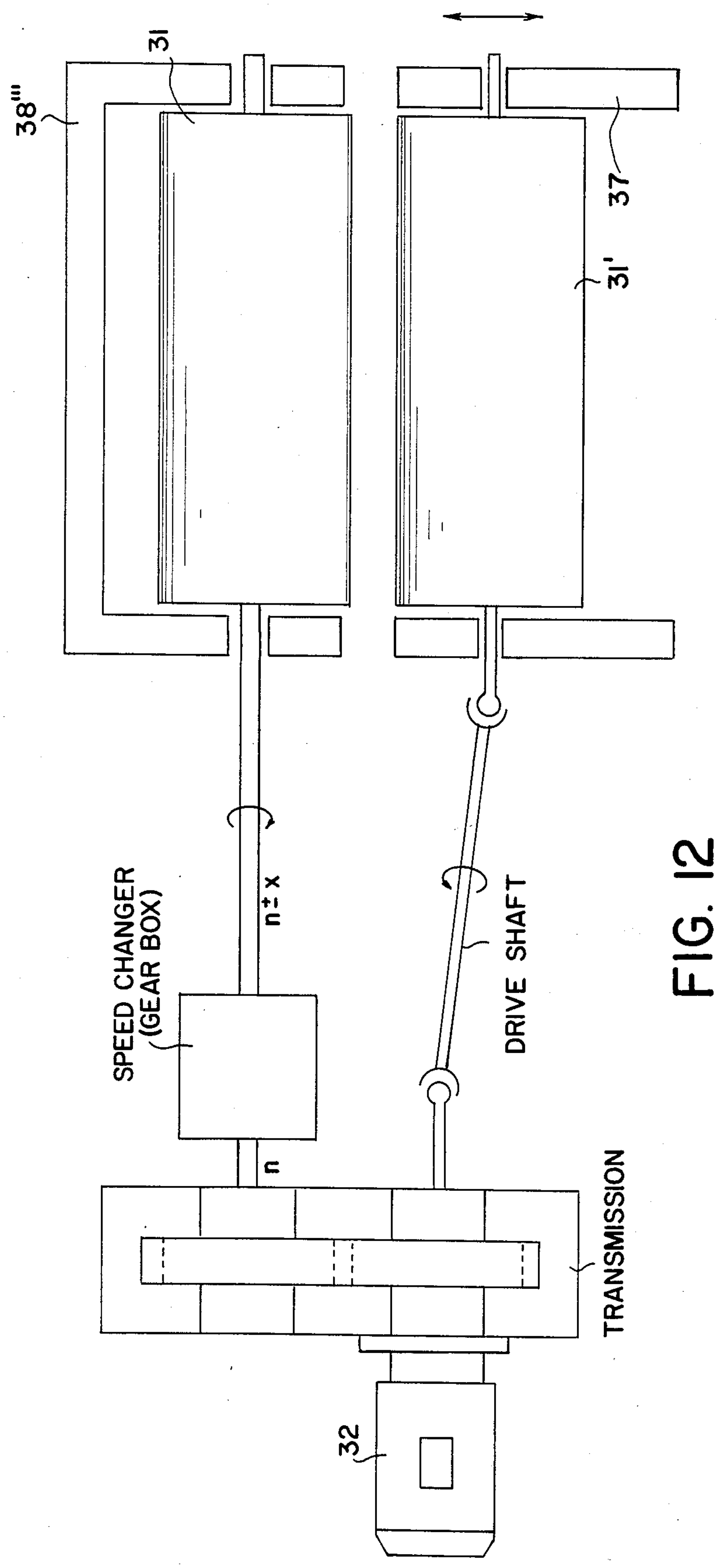
FIG. 12 is a view of the roller drive mechanism.

The bags to be discharged are supplied through a conveyor 1 into a bag cutting region 1'. The bag cutting region 1' is a partial region of the receiving housing 3, in which there is disposed a directional chute 4, causing the bags 3 to be guided towards the cutters 2, and wherein two respective cutters 2 face one another pairwise along their periphery, as well as being spaced coaxially at a distance from one another.

The coaxial spacing of the cutters 2 amounts to about one-third of the width of the bags; they are disposed externally to the directional chute 4, but they project with their periphery from above to below through the upper border 4' of the directional chute thereinto, and, project from below to above through the inclined floor 51 into the directional chute 4, the floor 51 being articulatably pivotable with respect to the receiving region of the directional chute 4 about an axle 52, the inclination depending on the load, and being in the direction of the inlet region of the cutters 2. The load-dependent inclination of the floor 51 is determined by one resilient element, which in the case of this example, is a gas-pressure spring 53, and wherein the spring characteristic is so adjusted, that in the case of an underweight of the bag, for example through a partial discharge due to damage, the bag is lifted to such an extent that practically the same penetration depth is provided by the cutters 2 disposed therebelow and thereabove. The bag is reduced to about one-third of its size in dependence of the above-named spacing during cutting.

Part of the goods originally filled into the bag therefore passes immediately to a portion of the inlet guidance 7, which forms a part of the receiving housing 3, while the rest of the goods remaining in the bag portion, or which is mixed therewith, is supplied to a sieve drum 8.

So as to limit the fragmented bags, and the goods removed therefrom with respect to the inlet guidance 7 of the receiving housing 3, namely to avoid back turbulence, there is provided in the outer region of the inlet guidance 7 a slightly overlapping and self-actuatedly skirt 9 closing off the sieve drum 8.

The empty bag material passing into the sieve drum 8, including any goods remaining therein or adhering thereto, is then subjected in the sieve drum 8 by means to be described later to a considerable movement, and hereby cleansed from the goods, and wherein the drum is so formed, that the discharge and cleansed bag material communicates through the empty bag chute 15 to the empty-bag chute-discharge 15'.

In the example described here, the sieve drum 8 is arranged to be inclined, but in a corresponding conveying embodiment of the installation it can also be disposed horizontally.

For the formation of the example-wise sieve drum 8, it is to be pointed out that the sieve drum 8 includes along at least 60% of its length, as viewed in the discharge direction, several accumulation rings 12 disposed at respective spacings from one another, and wherein the inner diameter of each accumulation ring may be equipped with an overlapping rubber ring 13. It is the purpose of the accumulation rings 12 to prevent a quick passing through the goods, as well as to prevent a quick passage of the bag material through the sieve drum 8, so that the main discharge of the goods to be separated is accomplished in the front region of the drum, while in the rear region thereof, namely in the end region, there is accomplished an intensive discharge of the remaining goods.

Furthermore, there are provided in the sieve drum 8 a plurality of entrainment hooks 11, which are distributed on the inner periphery, disposed in rows, and inclined transversely along the discharge direction, which grip the bag portions, lift them upwardly, and allow them to fall back to the base of the drum.

The entrainment hooks 11 are bent independently of their transverse position, namely in their center, by about 10°, so that the apices are aligned at a spacing to the base of the drum, and quasi-concentrically therewith.

The sieve drum 8 is disposed in a housing 14, which passes into the empty bag chute 15.

Below the drum region there is formed a chute 16 for fine goods, which passes into an outlet 16' for fine goods, and wherein the chute 16 is limited approximately in its central height region through a sieve 16'', which leads into a separate discharge region 16''' for oversized particles.

A vibrator 17 is associated with the floor of the chute 16 of the fine goods, so that there are formed three outlets 16''' for the connection thereof to elements passing the goods further on.

The drive of the sieve drum 8 is accomplished by at least one gear motor 18, which drives two shafts 18' aligned in parallel, and including respective drive rollers 18'', and wherein the drive rollers 18'' are associated in a force-locking manner with the ball races 8' connected to the sieve drum 8. The drum housing 14 surrounding the drum is equipped with a filter suction device 19.

As to the arrangement of the cutters 2 in the bag cutting region 1', it is to be pointed out, that the four cutters 2 provided are secured on flyingly arranged cutters pairs of shafts 5/5' and 6/6' for the cutters, the shafts being aligned towards one another. Each of these shafts is driven separately by an electric motor, and is passed immediately, ahead of its projection from a stationary carrier sleeve 21, through a double roller bearing 22. The cutter holder 20 proper is formed by two interengaging stress plates 23/24, wherein these stress plates are formed with a central conical through-going passage, and wherein this cone matches that of a clamping sleeve 25, disposed on these shafts, and also formed conically.

The front region of the conical clamping sleeve 25 is provided with a thread, so that, in connection with a stress nut 26, the two stress plates 23/24 are pressed to the cutters disposed therebetween. The cutters 2 are sharpened in a conical manner on one side, and wherein one flat side always faces the opposite flat side, while the cone-shaped ground edge faces in the direction of the drive. Therebeyond the cutters are provided with wave-shaped edges, wherein, for example, at a diameter of 500 mm, 60 wave-shaped edges are provided.

In a further development of this embodiment, a bag fulling device 31 through 39 is provided in the receiving housing 3, ahead of the directional chute 4 and of the actual bag cutting region 1'. The bag fulling region is intended for the loosening of lumpy or accumulated bag contents, which can arise, for example, while storing hygroscopic or compressed materials in the bag.

The rollers 31 are carried by a U-shaped carrier frame, which consists of an upper arm 38', a lower arm 38'' and a connecting arm 38''', and by a gliding sled 37 disposed between the two arms 38' and 38''. Each of the two rollers 31, namely the roller 31' slidably disposed in the gliding sled, 37, as well as the stationary roller 31'' disposed in the connecting rod 38''', may be driven by a respective separate motor 32, wherein, as a rule, one of the rollers 31, preferably the stationarily disposed roller 31'', is drivable by an adjustable gear drive member having a variable number of rotations.

The roller 31' which may be displaced parallel to the axis is settable through hydraulic positioning members 39, and wherein for the position of the displaceable roller 31', which determines the respective gap width, there is made available a security buffer path 39' through the positioning members 39, upon the maximum permissible load being exceeded.

Each mantle 33 of the roller is provided along its periphery with entrainment-or squeeze-elements 34–35, distributed parallel to the axle at uniform intervals.

The entrainment elements are round rods 34, with which are associated impact rods 35 displaced, respectively, by 180°.

The rollers 31 are driven in opposite respective directions inwardly, namely they draw material inwardly into the gap formed therebetween.

A variation of the device dispenses with the sieve for oversized particles, and proposes a concentric arrangement of cylindrical sleeves 61 around the sieve drum 8, in lieu thereof, and wherein the mesh width of the sieve 61 is smaller than that of the sieve drum 8, and corresponds approximately to that of the separating sieve 60'' for oversized particles. The sieve 61 is formed by three identical and separately replaceable springs 62, each forming in cross-section a circular segment, and is carried by a support construction 63. On the discharge side, the sieve 61 has a closed longitudinal region acting as a transfer zone 64 for oversized particles, which communicates with the discharge 65 disposed parallel to the axle.

We claim:

1. An apparatus for cutting bags into bag parts, wherein each bag contains powdery to granular goods, and/or granular to flocculent goods, as well as for loosening, fragmentation and separation of the goods from the bag, or from parts of the bag, and wherein each bag is made of paper, synthetic material, jute or the like, comprising in combination, a receiving housing, a cutting mechanism disposed in said receiving housing, a conveyor arranged to feed said cutting mechanism, a drum housing communicating with said receiving housing, and having separate outlets for the bag parts, and for the goods to be discharged, respectively, a sieve drum disposed in said drum housing, and having a predetermined length, a directional chute having an inlet, being disposed in said receiving housing, and being provided with a floor, said cutting mechanism including a plurality of cutters disposed partly above said floor and partly therebelow, said cutters having an inlet region, said directional chute having through-going openings for said cutters, an axle secured to said chute near said inlet, said floor being disposed pivotably about said axle, said axle being inclined along the direction of said inlet region in dependence on a load acting thereon, at least one resilient element supported at least indirectly on said receiving housing so that the inclination of said floor for a practically equal penetration depth of said cutters into the bag is set independently of the weight and thickness of the bag, said cutters being arranged in pairs so that the cutters of each pair face one another, a first cutter of the pair being coaxially aligned with the first cutters of all remaining pairs, the second cutter of the pair being coaxially aligned with the second cutters of all remaining pairs, at least one accumulation ring extending in a discharge direction, starting from a supply side of said goods, at least over a partial region of the length of said sieve drum.

2. The apparatus as claimed in claim 1, wherein said resilient element is adjustable, and includes a gas-operated spring.

3. The apparatus as claimed in claim 1, wherein said resilient element is adjustable, and includes a spring operable by fluid pressure.

4. The apparatus as claimed in claim 1, wherein said cutting mechanism further comprises a cutter carrier associated with each cutter, a shaft rotatably disposed within said cutter carrier, and partly external thereto, and cutter holding means located on a portion of said shaft disposed external of said cutter carrier, a corresponding cutter being replaceably connected to said cutter holding means.

5. The apparatus as claimed in claim 1, wherein said cutter carrier includes a sleeve, and said cutting mechanism further comprises roller bearing means disposed within said sleeve, said shaft being rotatably disposed within said roller bearing means, and wherein said cutter holding means further includes a conical clamping bushing converging outwardly, being slidable onto, and disposed external of said cutter carrier, and being formed with a thread at the outer end thereof, two stress plates engaging one another, each being formed with a passage for receiving said clamping bushing, a corresponding cutter having an opening for receiving said bushing, and being disposed between said stress plates, and a stress nut threadable onto said thread, whereby said corresponding cutter is held on said shaft by said cutter holding means.

6. The apparatus as claimed in claim 5, wherein said roller bearing means includes a double roller bearing.

7. The apparatus as claimed in claim 1, wherein each cutter has the shape of a truncated cone having opposite faces bounded by circles of small and large diameters, respectively, so as to result in a sharp cutting edge, the large and small diameters of each cutter of a pair of cutters being aligned with one another.

8. The apparatus as claimed in claim 7, wherein the periphery of each cutter is ridged.

9. The apparatus as claimed in claim 1, wherein sad partial region extends over at least 60% of the length of said drum, and further comprising a ring of elastic material releasable attachable onto said accumulation ring along the interior thereof.

10. The apparatus as claimed in claim 9, wherein said accumulation ring is made of rubber.

11. The apparatus as claimed in claim 1, wherein said sieve drum includes a plurality of entrainment hooks distributed along an inner periphery thereof, said entrainment hooks being generally disposed in a row, and inclined along said discharge direction.

12. The apparatus as claimed in claim 11, wherein each entrainment hook has an apex, and wherein said sieve drum has a floor portion, each entrainment hook being longitudinal, and having first and second portions of about equal length, said portions subtending an angle of about 170° with one another, and wherein said apices are aligned substantially within said sieve drum, and are spaced from said floor portion.

13. The apparatus as claimed in claim 1, wherein said receiving housing is formed in a discharge region thereof as an inlet guidance communicating with said sieve drum, and further comprising a skirt disposed near an end region of said sieve drum, and liftably closing off said sieve drum.

14. The apparatus as claimed in claim 1, further comprising a pair of fulling rollers disposed upstream of said directional chute so as to guide the bag, and distribute the contents thereof, each roller being separately drivable, at least the peripheral velocity of one of said rollers being independently adjustable from that of said other roller, the axes of said rollers being spaced from one another at a predetermined distance, and positioning means for shifting at least said one of said rollers a variable settable distance from said other of said rollers, and for releasing an additional load-dependent buffer path for the goods during an overload.

15. The apparatus as claimed in claim 14, further comprising a separate drive for each roller in the form of a motor.

16. The apparatus as claimed in claim 14, further comprising a gear associated with each roller, and including take-off means providing a certain number of revolutions per minute, said gear including a gear member for variably adjusting said number of revolutions per minute.

17. The apparatus as claimed in claim 14, further comprising a U-shaped carrier frame having two legs for carrying said one of said rollers, and wherein said positioning means includes a sled movable between said legs, and actuatable by pressure means, a connecting bar joining said legs, and wherein said other of said rollers is stationary and disposed in a region of said connecting bar.

18. The apparatus as claimed in claim 14, further comprising longitudinal entrainment elements forming squeezing rods around the periphery of each roller at substantially uniform respective spacings, and being parallel to the axis of a corresponding roller.

19. The apparatus as claimed in claim 17, wherein said longitudinal elements are rods, each having a round cross-section, and wherein each roller has a predetermined direction of rotation, and further comprising impact rods associated with at least two of said longitudinal entrainment elements displaced by about 180° from one another, and being inclined along said direction of rotation.

20. The apparatus as claimed in claim 3, further comprising a support structure, and wherein said cylindrical sieve includes a plurality of assembled, but individually replaceable sieve panels being carried by said support structure, each sieve panel having a cross-section in the form of a circular segment.

21. The apparatus as claimed in claim 1, further comprising a cylindrical sieve having a comparatively small mesh size, and being concentrically wrapped around said sieve drum at a predetermined spacing therefrom, and a closed longitudinal region serving as a discharge zone for oversized particles, and being disposed parallel to said axis, said cylindrical sieve communicating at least on a discharge side thereof with said closed longitudinal region.

* * * * *